US012554282B2

(12) United States Patent
Abdelhameed

(10) Patent No.: US 12,554,282 B2
(45) Date of Patent: Feb. 17, 2026

(54) DATA SYNCHRONIZATION FOR VALIDATION AND CORRECTION IN AUTONOMOUS SYSTEMS AND APPLICATIONS

(71) Applicant: NVIDIA Corporation, Santa Clara, CA (US)

(72) Inventor: Mohamed Saad Abdelhameed, Dachau (DE)

(73) Assignee: NVIDIA Corporation, Santa Clara, CA (US)

( * ) Notice: Subject to any disclaimer, the term of this patent is extended or adjusted under 35 U.S.C. 154(b) by 513 days.

(21) Appl. No.: 17/941,665

(22) Filed: Sep. 9, 2022

(65) Prior Publication Data

US 2024/0085938 A1 Mar. 14, 2024

(51) Int. Cl.
*G06F 1/04* (2006.01)
*G06F 1/08* (2006.01)

(52) U.S. Cl.
CPC . *G06F 1/04* (2013.01); *G06F 1/08* (2013.01)

(58) Field of Classification Search
CPC .................................... G06F 1/04; G06F 1/08
See application file for complete search history.

(56) References Cited

U.S. PATENT DOCUMENTS 5,519,618 A * 5/1996 Kastner .................... G08G 5/51 701/120
2017/0041688 A1* 2/2017 Pitigoi-Aron ............. G06F 1/08
2019/0317513 A1* 10/2019 Zhang .................... G06V 10/96
2020/0051318 A1 2/2020 Muthler et al.
2022/0123849 A1* 4/2022 McCall ................. H04J 3/0658

OTHER PUBLICATIONS

Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

* cited by examiner

*Primary Examiner* — Terrell S Johnson
(74) *Attorney, Agent, or Firm* — Davis Wright Tremaine LLP

(57) ABSTRACT

In various examples, a corrective operation may be performed based at least in part on detecting that at least one circuit is operating asynchronously with respect to a reference clock. An indication that at least one circuit operating asynchronously was detected may be generated. Upon detecting a circuit operating asynchronously, a corrective operation may be performed such that a component that receives data generated using the at least one circuit continues operating in view of the indication.

28 Claims, 12 Drawing Sheets

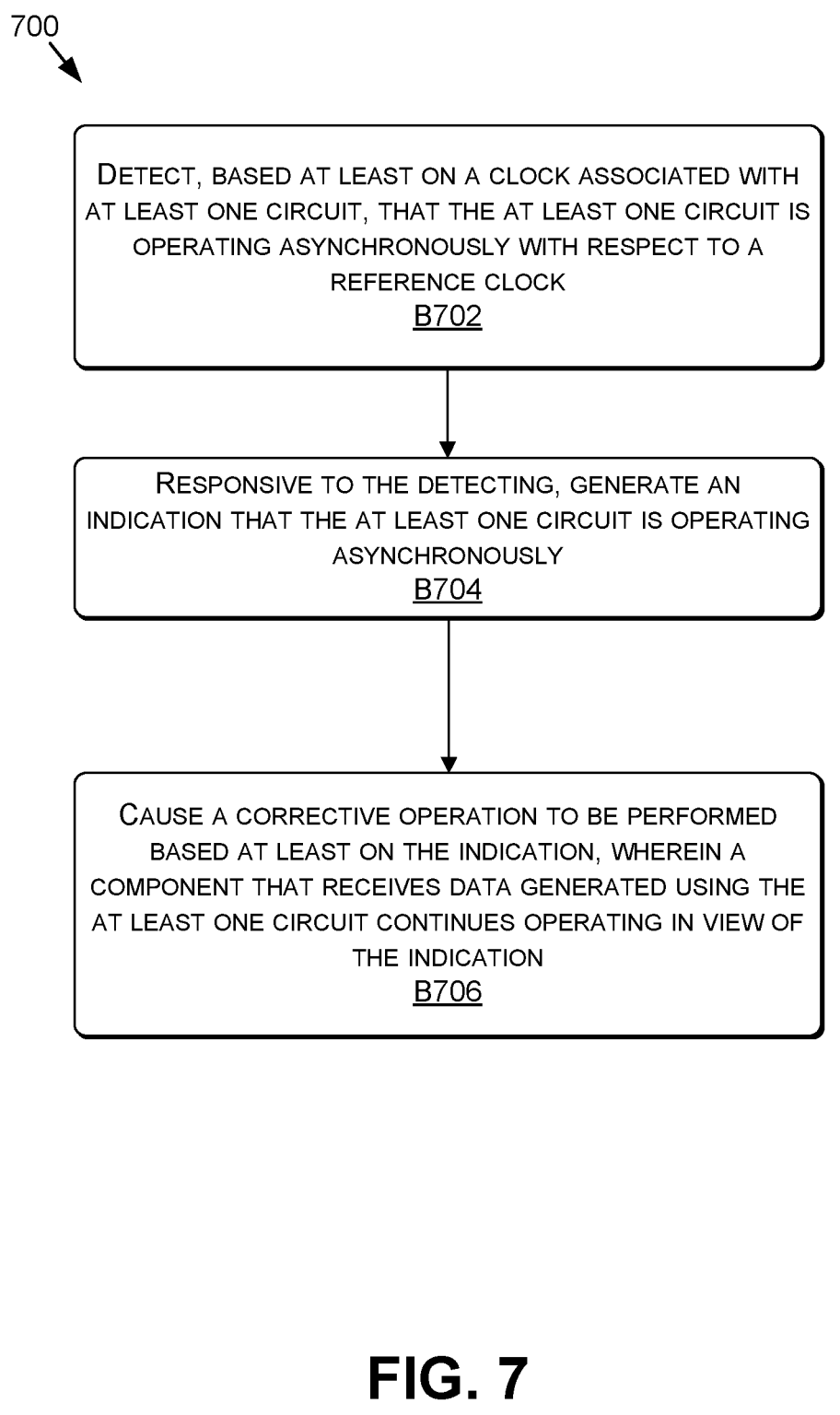

700

DETECT, BASED AT LEAST ON A CLOCK ASSOCIATED WITH AT LEAST ONE CIRCUIT, THAT THE AT LEAST ONE CIRCUIT IS OPERATING ASYNCHRONOUSLY WITH RESPECT TO A REFERENCE CLOCK
B702

RESPONSIVE TO THE DETECTING, GENERATE AN INDICATION THAT THE AT LEAST ONE CIRCUIT IS OPERATING ASYNCHRONOUSLY
B704

CAUSE A CORRECTIVE OPERATION TO BE PERFORMED BASED AT LEAST ON THE INDICATION, WHEREIN A COMPONENT THAT RECEIVES DATA GENERATED USING THE AT LEAST ONE CIRCUIT CONTINUES OPERATING IN VIEW OF THE INDICATION
B706

FIG. 7

DATA SYNCHRONIZATION FOR VALIDATION AND CORRECTION IN AUTONOMOUS SYSTEMS AND APPLICATIONS

TECHNICAL FIELD

At least one embodiment pertains to methods and/or systems for data synchronization that may be used for validation and/or correction (e.g., in autonomous or semi-autonomous machines). For example, at least one embodiment pertains to synchronizing one or more clock signals within a System on a Chip (SoC) using various novel techniques described herein. By way of another example, at least one embodiment pertains to an autonomous or semi-autonomous machine (e.g., a vehicle) including such a SoC.

BACKGROUND

Autonomous and semi-autonomous machines (e.g., robots, vehicles) rely on various interconnected components such as sensors, processors, buses, and/or memory to perform a wide variety of operations. Each of these components may operate according to one or more clock sources and according to various time domains that may have unique and/or distinct frequencies, sampling rates, and/or data rates. As data is generated and/or processed by these components, the data may be associated with timestamps that provide indications of particular instances in time at which the data was captured. In order to use data collectively gathered from multiple components operating in accordance with the associated timestamps, the components must be synchronized in one or more time domains using a "primary clock" or system clock that dictates a system level reference clock that can be used to associate related portions of data, such as data related to events occurring at a particular instance of time. However, due to component failure, interference, network latency, network errors, and/or clock drift, components of a system may become unsynchronized with respect to one another or the system at large. In the context of autonomous and semi-autonomous machines, if one or more sensors or other components becomes asynchronous with the system level reference clock, it may interfere with the data processing, decision making, logical operations, artificial intelligence, predictive determinations, and/or numerous other processes and/or operations of the autonomous or semi-autonomous machine.

To prevent asynchronous processes and/or devices from causing errors and/or undesired results, it may be necessary to terminate or otherwise disable—at least temporarily—such asynchronous processes and/or devices to allow the processes and/or devices to be synchronized with the system level reference clock. Unfortunately, disabling one or more processes and/or one or more devices may cause disruption to the operation of an autonomous or semi-autonomous machine.

BRIEF DESCRIPTION OF THE DRAWINGS

The present systems and methods for data synchronization for validation and correction in autonomous or semi-autonomous machines are described in detail below with reference to the attached drawing figures, wherein:

FIG. 7 is a flow diagram showing a method updating controls of an autonomous machine with corrected timestamps, in accordance with some embodiments of the present disclosure;

DETAILED DESCRIPTION

Figure 1:
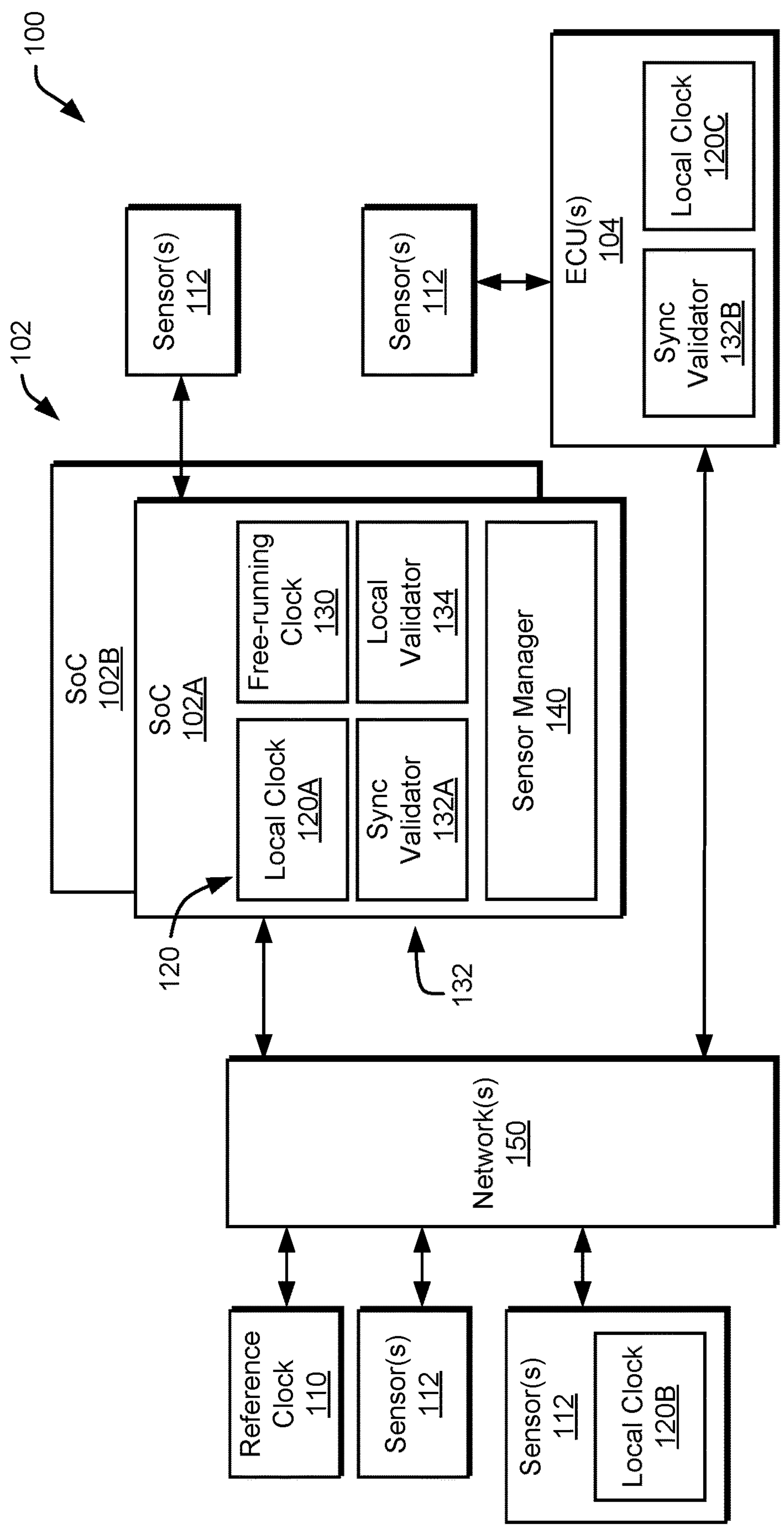
FIG. 1 is a diagram of an example of a time synchronization system, in accordance with some embodiments of the present disclosure.

Embodiments of the present disclosure relate to data synchronization that may be used for validation and/or correction (e.g., in autonomous machines). Systems and methods are disclosed that may use first timestamps (e.g., provided by a system-level reference time signal) and second timestamps (e.g., provided by one or more components of a particular one of the systems) to validate a time synchronization and/or, in the event that one of more components fall out of synchronization with the particular system, perform corrective actions to re-synchronize the particular system allowing for fault-tolerance and continued operation.

In contrast to conventional systems, such as those described above, a corrective action may be determined based on data received by one or more validators instead of—e.g., temporarily—deactivating operations and/or discarding data associated with a system due to unfavorable or unvalidated synchronization conditions. Operations associated with a system may be preserved by using time synchronization validators that may analyze timestamps associated with one or more components to determine a deviation associated with the one or more components and a reference clock. The validators may then perform and/or instruct corrective actions to take place which may adjust, or otherwise modify, timestamps associated with one of more components to place the system into a synchronized state.

Systems and methods are disclosed related to data synchronization (e.g., for validation and correction in autonomous or semi-autonomous machines). Systems and methods are disclosed that may use one or more time synchronization components to analyze one or more timestamps associated with sensor data to detect potential time deviation events (e.g., clock drift, one or more clock malfunctions, etc.). Timestamps from a reference clock source and timestamps from one or more local clock sources associated with collected sensor data may be compared over a period of time to determine the occurrence and severity of differences or time deviations in the time values reported from the various clock sources. Upon determining that a time deviation exists, a corrective operation may be performed to modify one or more timestamps associated with the detected time deviation (e.g., the timestamps from one or more local clock sources) such that the time deviation is corrected to allow the corresponding sensor data to be used for continuous autonomous or semi-autonomous machine operations without triggering a fault state.

In some embodiments, one or more reference clocks (e.g., primary or global clocks) are used to maintain and indicate a reference time for one or more components of a system. For instance, an indication of time provided by a reference clock (e.g., a primary or global clock source) may be used by networked, or otherwise connected, components and/or devices to provide synchronization and/or interconnection between the various components and/or devices. In some embodiments, a reference clock may be used to validate and/or update one or more other dependent clocks (e.g., local clocks) located throughout a system. For example, in a system including multiple independent components (e.g., multiple devices, sensors, processors, etc.), each component may maintain one or more dependent clocks which may be updated according to an indication of time provided by a reference clock (e.g., using a Precision Time Protocol ("PTP") synchronization). In some embodiments, a dependent clock may be updated periodically based on a reference clock and/or updated according to any time interval or condition. In some embodiments, a dependent clock may be free-running or continue to track time between updates from a reference clock.

In some embodiments, a reference clock may be used to validate a time value indicated by another clock, such as a dependent clock. For example, a time value (e.g., a timestamp) indicated by a reference clock may be compared to a time value (e.g., a timestamp) indicated by one or more other clocks to access an accuracy level and/or a validity level of the other clocks. In some embodiments, the time values indicated by a reference clock at a plurality of time instances may be compared to the time values indicated by other clocks at the plurality of time instances to identify possible errors (e.g., clock drift, one or more clock malfunctions, interference, etc.) and/or inconsistencies between the reference clock and the other clocks. For example, a reference clock may be used to determine a first length of a time interval between a first instance of time and a second instance of time and subsequently compare the determined first length to a second length of time corresponding to another clock between the first instance of time and the second instance of time to identify a degree to which the clocks are able to track time accurately with respect to one another.

In some embodiments, the reference clock may be used to validate time synchronization across a number of devices, each having a local dependent clock that may be updated according to the reference clock. For example, several components may rely on an indication from a system-level reference clock to periodically update dependent clocks that are local to particular components. In such an example, once the local dependent clocks are updated at each of the several components, the time indicated by the clocks (local and reference) may be compared to identify potential synchronization and/or component failure.

In some embodiments, a time value indicated by a clock, such a local clock associated with a particular component, may be used to generate one or more timestamps associated with the component. In some embodiments, the timestamp may indicate a particular time and/or sequence of timing events associated with one or more actions, operations, and/or data associated with a component. For example, a RADAR sensor of an autonomous machine may generate object data including metadata indicating a timestamp corresponding to a time at which the data was captured and/or generated according to a local clock, located at, or otherwise associated with, the RADAR sensor. As an example, object data may be structured to include an associated timestamp and/or other data qualifiers, such as a safety integrity flag. For instance, object data may be organized as: [OR Data: TS: Data Qualifiers], where TS is one or more timestamps associated with the object data. In some embodiments, a timestamp may include an indication of time based on multiple clock sources. For example, a timestamp may be represented as a time tuple indicating an instance of time associated with a reference clock and the instance of time associated with a local clock (e.g., "[ts: TS]," where ts is a time according to a local clock and TS is the time according to a reference clock).

In some embodiments, a system, such as a system of an autonomous or semi-autonomous machine, may rely on multiple sensors, processors, and/or other components to provide data needed for machine operations such as object detection, motion calculation, prediction, and/or any other suitable operation. For example, an autonomous vehicle, such as vehicle 800 of FIGS. 8A-8D, may rely on any number of RADAR sensors, cameras, LiDAR sensors, ultrasonic sensors, accelerometers, and/or other sensors to provide operations associated with navigating a roadway or other environment. In such an example, each of the sensors may be collecting and generating object data with timestamps associated with one or more local clocks, and may collect and/or generate data at different rates (e.g., frame rates). For example, a camera may generate image frames at 60 frames per second (fps), while a LiDAR sensor may generate LiDAR data (e.g., representative of point clouds) at 10 fps. In some embodiments, object data having timestamps generated using different clocks may be synchronized to enable information generated from different sources (e.g., different sensors) to be collectively and accurately analyzed and/or processed. For example, object data generated by a RADAR sensor may be synchronized with object data generated by a camera, to provide accurate object detection and/or tracking operations for objects represented in the RADAR and camera object data even in cases where the camera and RADAR object data are timestamped according to distinct local clocks. In such an example, the RADAR data may be captured less frequently than the image data, but the system may analyze the RADAR data and the image data corresponding to a same time. As such, the RADAR data may be propagated (e.g., using ego-motion) to a time associated with the image data, or the image data may be propagated to a time associated with the RADAR data. In either case, the accuracy of the timestamps corresponding to the image data and the RADAR data is critical to the accuracy of the predictions generated using the image data and the RADAR data. For example, if the timing is not synchronized with respect to the image data and the RADAR data, then the predictions may be made using data corresponding to different times, which may result in less accurate or reliable results.

In some embodiments, synchronizing object data generated with timestamps associated with multiple clocks may include validating the timestamps based on a system-level reference clock. For example, timestamps generated from local clocks within a system may be compared to timestamps associated with a reference clock. In some embodiments, validating one or more timestamps may involve calculating a time deviation or time offset between timestamps associated with sensor data, and generated with one or more local clocks and/or a reference clock. For example, it may be determined that one or more local clocks are not advancing in time at the same rate and that the difference in time values reported by the one or more local clocks is increasing at an interval that exceeds a deviation interval threshold.

In some embodiments, one or more time sync validators may be used to validate time synchronization and may receive timestamps associated with one or more local clocks to determine a time deviation. A time sync validator may calculate the difference between a time provided by a first local clock (or multiple local clocks) and the time provided by a reference clock and use the calculated difference to determine an expected time for a second local clock. This expected time for the second local clock may then be compared to the observed time provided by the second local clock to identify any deviation in the observed time. As an example, at a first instance of time the difference between a first local clock and a reference clock may be determined to be 900 microseconds ("μs"). At a second instance of time, 200 μs after the first instance of time, the difference between the current time of the reference clock and the time provided by a second local clock is expected to be, or be relatively near, 900 μs. In such an example, if the time indicated by the second local clock exceeds a threshold for the expected time value, a deviation event may be identified indicating a possible timing error associated with the second local clock.

In some embodiments, a local sync validator may be used to detect interference and/or potential errors in the indication of time provided by a reference clock. For example, one or more local sync validators may detect large gaps (e.g., jumps) in the time provided by a reference clock. In some embodiments, a threshold jump value may be used to detect time jumps in the time provided by the reference clock that exceed the threshold jump value and which may indicate an error and/or other issue with the reference clock. For example, a threshold jump value of 10 milliseconds ("ms") may be used to identify instances in which the timestamps generated using the reference clock indicate a jump exceeding the 10 ms threshold. In some embodiments, a local sync validator, upon detecting a large time gap (e.g., exceeding the threshold), may provide an indication to one or more time sync validators in association with, or in place of, an identified time deviation.

In some embodiments, when a time deviation is identified, one or more corrective operations ("corrections") may be performed. A corrective operation may include an action or procedure that adjusts, or is otherwise applied in association with, one or more timestamps corresponding to the identified time deviation. In some embodiments, a corrective operation may be performed by one or more time sync validators, while in at least one other embodiment, a corrective operation may be performed by one or more other components. In some embodiments, a corrective operation may correct a time deviation detected in a timestamp by modifying the timestamp. For example, a time sync validator may identify that a portion of a timestamp, associated with a local clock of a particular component and/or portion of a system, exhibits a time deviation of a particular amount or magnitude. In such an example, the time sync validator may determine a corrective operation to perform that replaces, supplements, and/or otherwise modifies the portion of the timestamp identified as having a time deviation. As an example, if a portion of a timestamp associated with a radar sensor has an estimated deviation of 400 μs, that portion of the timestamp may be incremented/decremented according to the 400 μs deviation as a corrective operation. In some embodiments, the timestamp may not be modified in response to a detected deviation but another indication, such as a flag, may be provided to indicate that a deviation is identified for a particular timestamp and/or object data. In at least one embodiment, the timestamp may be modified and presented with an additional indication (e.g., flag) that the timestamp has been altered through a corrective operation.

In some embodiments, once one or more corrective operations have been performed, the adjusted object data, and associated timestamps, may be provided to one or more processors that may be used for performing one or more autonomous or semi-autonomous machine operations. In some embodiments, the one or more processors may use the adjusted object data, and associated timestamps without additional corrective action, while in at least one embodiment, the one or more processors may perform additional analysis and/or processing of the provided data. For example, in a sensor fusion process, the updated timestamp generated based on the deviation may be used to aid the system in identifying the proper sensor data instance to use in the sensor fusion processing. In such an example, where a first sensor data instance may have been selected for sensor fusion at a particular time due to the error in the clock, the determined deviation in time may be used to select a second sensor data instance that is more proper for the particular time. As another example, where sensor fusion is executed, the sensor modality experiencing the issue may be ignored or discarded from the sensor fusion processing, at least during the time that the clock error is being addressed, and until the clock is back in synchronization with the reference or global clock. In such an example, where sensor fusion is performed using a first camera, a second camera, a LiDAR sensor, and a RADAR sensor, and the clock deviation corresponds to the second camera, sensor fusion may be performed—at least temporarily—using only the first camera, the LiDAR sensor, and the RADAR sensor. As such, rather than shutting down the sensor fusion process, or ignoring outputs of the sensor fusion process based on the clock deviation, the sensor fusion processing may still be performed—at least temporarily—using a smaller set of sensor data.

With reference to FIG. 1, FIG. 1 is a diagram of an example of a time synchronization system 100 (or "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

System 100 may include one or more sensor(s) 112, a reference clock 110, network(s) 150, one or more system on chips ("SoC(s)"), such as SoC 102A and SoC 102B (referred to collectively or individually herein as "SoC(s) 102"), and/or one or more Electronic Control Unit(s) ("ECU(s)") 104. SoC(s) 102 may include a local clock 120A, a free-running clock 130, a sync validator 132A, a local validator 134, and/or a sensor manager 140.

Components of system 100 may be configured to communicate across one or more networks, such as network(s) 150. Network(s) 150 may include one or more networks of any number of network types. In any example, one or more of the components of system 100 may communicate with one or more different components of system 100 via one or more of network(s) 150. In some examples, network(s) 150 include one or more data bus protocols and/or topologies (e.g., CAN, FlexRay, Ethernet, etc.).

SoC(s) 102 may include one or more components for performing one or more operations associated with an autonomous or semi-autonomous machine (e.g., sensor operations, safety validations, etc.). For example, SoC(s) 102 may include one or more components for processing and/or organizing sensor data generated by one or more sensor(s) 112, one or more components for performing calculations, and/or one or more components for making predictions corresponding to an autonomous or semi-autonomous machine. As an example, SoC(s) 102 may use sensor data obtained from sensor(s) 112 to predict location and/or movements of objects (e.g., obstacles, vehicles, pedestrians, etc.) within the environment occupied by an autonomous machine (e.g., automobile), such as by using or more machine learning models. Using sensor manager 140, SoC(s) 102 may collect sensor data from sensor(s) 112 and/or ECU(s) 104 and determine one or more operations to perform, such as with respect to an autonomous or semi-autonomous (ADAS) software driving stack—which may include a sensor management layer, a world model management layer, a perception layer, a control layer, an actuation layer, a collision avoidance layer, and/or other layer types. For example, with respect to a control layer, the processing described herein may be used to modify one or more control components or operations of an autonomous or semi-autonomous machine.

ECU(s) 104 may include one or more components for processing data associated with one or more machine operations. In some embodiments, ECU(s) 104 may provide additional and/or alternative processing to the processing performed by one or more SoC(s) 102. In some examples, ECU(s) 104 may perform processing associated with a particular set of sensors(s) 112 of system 100. For example, one or more ECU(s) 104 may be configured to process measurement data from one or more inertial measurement unit sensors, while other sensors, such as LiDAR sensors and cameras, may be associated with one or more SoC(s) 102. In some embodiments, ECU(s) 104 may include a local clock 120C used to generate time information corresponding to sensor data associated with ECU(s) 104. For example, as ECU(s) 104 processes sensor data generated by associated sensor(s) 112, a timestamp generated using local clock 120C may be appended or otherwise associated with the sensor data. In some embodiments, ECU(s) 104 may include one or more sync validators 132 (e.g., time sync validators 132) configured to determine one or more time deviations between one or more clocks associated with ECU(s) 104 as discussed in detail below.

Reference clock 110 may include one or more components configured to provide time synchronization information to one or more components of system 100, such as local clocks 120, ECU(s) 104, and/or SoC(s) 102. Reference clock 110 (alternatively referred to as a "primary clock" or a "global clock," herein) may include one or more clock sources used to generate time values which may be used in association with time synchronization operations. For instance, reference clock 110 may include a hardware clock source used to generate time synchronization signals which may be transmitted to local clocks 120 as part of a time synchronization operation to synchronize local clocks 120 to reference clock 110. In some embodiments, reference clock 110 may distribute one or more time synchronization signals according to one or more time synchronization protocols, such as PTP.

System 100 may include one or more local clocks 120, such as local clock 120A, local clock 120B, and local clock 120C, configured to track time that may be used in connection with one or more operations performed by one or more components (e.g., sensors, processors, etc.) associated with local clocks 120. For example, local clock 120C may maintain a time value associated with one component, such as ECU(s) 104, while local clock 120B may maintain a time value associated with some other component, such as sensor(s) 112. In some embodiments, local clocks 120 may update their respective time values based on receiving a signal causing the local clocks 120 to update the time. For example, local clocks 120 may receive time values from another clock, such as reference clock 110, causing local clocks 120 to update their time value accordingly.

Free-running clock 130 may include one or more components configured to track time that may be used in connection with one or more operations performed by one or more components associated with free-running clock 130. For example, one or more components of system 100 may perform operation which depend on a global time, such as a time generated with reference clock 110, while one or more other components may perform operations that rely on a distinct clock signal such as a signal generated by free-running clock 130. In some embodiments, one or more local clocks 120 associated with a particular component may be periodically updated based on reference clock 110, while free-running clock 130 may continue to run to record advancing time without an update or synchronizing operation.

Sync validators 132, such as sync validator 132A and/or sync validator 132B, may include one or more components configured to determine one or more time deviations between one or more clocks associated with one or more components of system 100, and/or determine a corrective operation that may be performed to correct a time deviation. In some embodiments, sync validators 132 may perform time synchronization and corrective operations in association with a set of components of system 100. For example, sync validator 132A may correspond to components on SoC 102A, while another sync validator 132 may correspond to SoC 102B, and a sync validator 132B may correspond to one or more ECU(s) 104. One or more sync validators 132 may perform corrective operations from one or more sub-systems of system 100.

In some embodiments, the sync validators 132 may receive time information from one or more local clocks 120.

For example, the sync validators 132 may calculate the difference between a time provided by one or more local clocks 120 and the time provided by reference clock 110 and use the calculated difference to determine an expected time for a particular local clock 120 to identify any deviation in the observed time for that particular local clock 120. In some embodiments, sync validators 132 may determine that a time deviation in a timestamp associated with one or more local clocks 120 may exceed a predetermined time interval threshold and may require a corrective operation to correct.

Local validator 134 may include one or more components configured to analyze signals generated by reference clock 110. In some embodiments, local validator 134 may access one or more synchronization signals, such as synchronization signals or time data generated by reference clock 110. Local validator 134 may analyze one or more signals to detect interference and/or time jumps associated with the one or more signals. For example, local validator 134 may analyze a series of time data from reference clock 110 to check if the increments of time represented by the analyzed data is within an acceptable range and/or below a time jump threshold value. In some embodiments, signals received by local validator 134 may include one or more timestamps. For example, local validator 134 may calculate the difference in recorded time between a first timestamp and a subsequent second time stamp. In some embodiments, local validator 134 may provide an indication to one or more sync validators, such as sync validator 132A, of an identified time deviation and/or time jump.

Sensor(s) 112 may include one or more components for collecting data associated with system 100. For example, system 100 may include one or more sensor(s) 112 that collect and/or generate sensor data associated with the operations of one or more autonomous or semi-autonomous machines. As an example, sensor(s) 112 may include one or more RADAR sensors, cameras, ultrasonic sensors, LiDAR sensors, accelerometers, gyroscopes, magnetometers, altimeters, and/or any other suitable sensor, such as those described in relation to vehicle 800 of FIGS. 8A-8D. As mentioned above, in some embodiments, one or more sensor(s) 112 (and/or ECUs associated therewith) may include a local clock 120, that may be configured to measure time and associate the measured time with a portion of generated sensor data. For example, as a sensor is generating sensor data, the sensor data may be appended and/or associated with a timestamp calculated using local clock 120 that is associated with the particular sensor. For instance, as a camera sensor is generating image data, the image data may be generated to include timestamps for one or more frames of the generated image data using local clock 120.

Sensor manager 140 may include one or more components configured to receive and analyze sensor data from one or more sensor(s) 112. Sensor manager 140 may receive sensor data from one or more sensors of one or more sensor modalities (e.g., camera, RADAR, GPS) and combine the sensor data to form insights and/or make decisions corresponding to machine operations, such as predicting the location and/or movement of detected objects. For example, autonomous or semi-autonomous vehicle, such as vehicle 800 of FIGS. 8A-8D, may rely on a combination of RADAR and camera sensors to detect the location of detected objects and make estimations about the future position of the detected objects. In such an example, sensor manager 140 may combine sensor data generated by RADAR sensors with sensor data generated using one or more cameras to produce an accurate understanding of a machine's environment. In some embodiments, sensor manager 140 may use timestamps associated with sensor data to facilitate the combination and analysis of the sensor data. For example, sensor manager 140 may receive sensor data, corresponding to a number of sensor(s) 112, that may have been generated with timestamps based on multiple distinct local clocks 120. In such an example, sensor manager 140 may use the received timestamps to extrapolate and/or interpolate information based on the sensor data.

Figure 2:
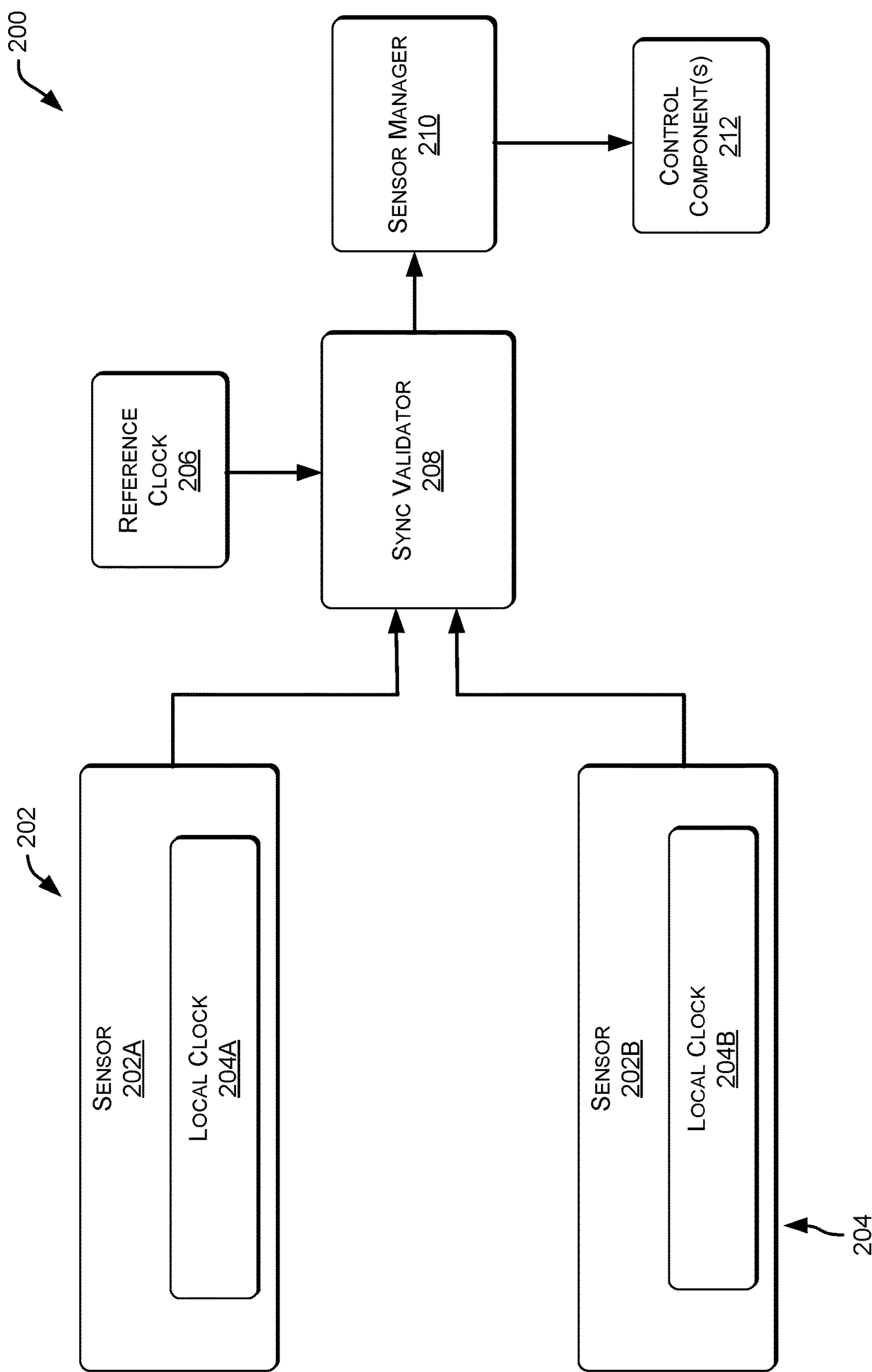
FIG. 2 is a diagram showing an example of a sensor synchronization, in accordance with some embodiments of the present disclosure.

Now referring to FIG. 2, FIG. 2 is a diagram showing an example of a sensor synchronization 200, in accordance with some embodiments of the present disclosure. It should be understood that this and other arrangements described herein are set forth only as examples. In some embodiments, one or more sensors such as sensor 202A and 202B (referred to collectively herein as "sensors 202") may generate one more streams of sensor data. In some embodiments, each of sensors 202 may correspond to a distinct type of sensor and/or distinct location or orientation. For example, sensor 202A may be a RADAR sensor while sensor 202B may be a camera or image sensor. In some embodiments, one or more of sensors 202 may be associated with a local clock. For example, sensor 202A and/or sensor 202B may have an associated local clock such as local clock 204A and local clock 204B, respectively. Local clock 204A and local clock 204B (referred to collectively or individually herein as "local clock(s) 204") may generate time data that may be used by sensors 202 to associate a timestamp with the sensor data as it is generated.

In some embodiments, the sensor data generated by sensors 202 along with the associated timestamps, may be transmitted to one or more time sync validators, such as sync validator 208. In some embodiments, sync validator 208 may determine a time deviation associated with the received sensor data and associated timestamps. For example, sync validator 208 may detect a clock drift between the timestamps generated by local clock 204A and local clock 204B. In some embodiments, sync validator 208 may use time information, such as synchronization signals from reference clock 206, to identify time deviations between the sensors 202. As an example, at a first instance of time, sync validator 208 may determine that a timestamp from sensor 202A leads the timestamp from reference clock 206 by 600 μs. In this example, at a second instance of time –400 μs after the first instance of time—sync validator 208 may determine that a timestamp from sensor 202B leads the timestamp from the reference clock 206 by 300 μs. Thus, in this example, at a third instance of time –300 μs after the second instance of time—sync validator 208 can determine an expected value (sensor 202A leading reference clock 206 by 600 μs and sensor 202B leading reference clock 206 by 300 μs) for the time reported by the timestamps from sensor 202A and 202B and compare the expected values to observed timestamps associated with each respective sensor.

In some embodiments, once sync validator 208 identifies a deviation in the timestamps associated with sensors 202, sync validator 208 may determine a corrective operation. For example, if sync validator 208 receives a sample of sensor data from sensors 202 that has a timestamp determined to have a particular deviation value from the expected time value, sync validator 208 may determine that a corrective operation is needed (e.g., updating the timestamp for the sensor data sample according to the deviation). In some embodiments, sync validator 208 may update, adjust, override, or otherwise modify a timestamp as part of a corrective operation. In some embodiments, sync validator 208 may transmit a modified timestamp to sensor manager 210, while in at least one other embodiment, the corrective operation may be performed by a different component from sync validator 208, such as sensor manager 210.

In some embodiments, sensor manager 210 may receive sensor data and one or more timestamps from sync validator 208. In some embodiments, the timestamps may have been modified by sync validator 208 as part of a corrective operation, while in at least one embodiment sensor manager 210 may receive an indication that sync validator 208 detected a time deviation. Sensor manager 210 may use the sensor data and the corresponding timestamps to generate a representation of the environment of a machine (e.g., the road surface of an autonomous vehicle), which may be used, in turn to navigate the environment—e.g., by control component(s) 212 of the autonomous machine.

Figure 3:
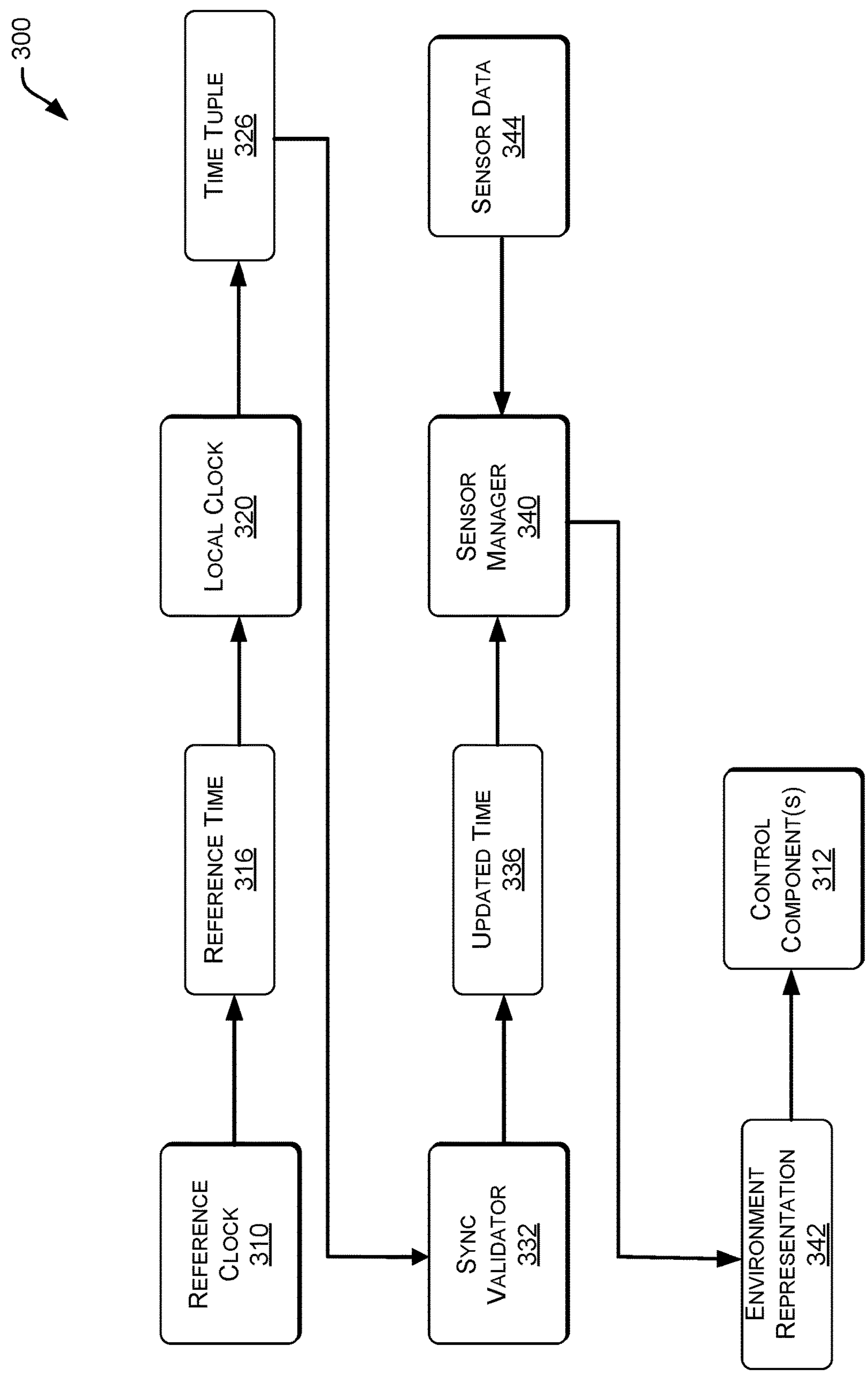
FIG. 3 is a diagram showing an example process 300 for fault-tolerant time synchronization, in accordance with some embodiments of the present disclosure.

Now referring to FIG. 3, FIG. 3 is a diagram of an example process 300 for fault-tolerant time synchronization, in accordance with some embodiments of the present disclosure. It should be understood that this and other arrangements described herein are set forth only as examples. In some embodiments, a reference clock 310 may generate a reference time 316 that may be distributed to one or more receiving components. For example, reference clock 310 (e.g., reference clock 110 of FIG. 1 or reference clock 206 of FIG. 2) may generate a reference time 316 structured as a timestamp and may transmit reference time 316 to at least a local clock 320 (e.g., one of local clock(s) 120 of FIG. 1 and/or one of local clocks 204 of FIG. 2). In some embodiments, local clock 320 may have its own corresponding time source and may be free-running (e.g., one of free-running clock(s) 130 of FIG. 1). In some embodiments, local clock 320 will receive reference time 316 from reference clock 310 and may use reference time 316 to generate a time tuple 326 that may include a timestamp associated with reference clock 310 and a timestamp associated with local clock 320.

In some embodiments, time tuple 326 may be transmitted to a sync validator 332 (e.g., one of sync validator(s) 132 of FIG. 1 and/or sync validator 208 of FIG. 2), which may analyze and/or evaluate time tuple 326 to identify a possible time deviation in one or more timestamps included in time tuple 326. In some embodiments, sync validator 332 may identify a time deviation in time tuple 326 and may determine one or more corrective actions to resolve the time deviation. For example, sync validator 332 may determine an amount of time by which to increment/decrement one or more timestamps included in time tuple 326 to generate an updated time 336.

In some embodiments, updated time 336 may be transmitted to a sensor manager 340 (e.g., one of sensor manager(s) 140 of FIG. 1 or sensor manager 210 of FIG. 2). Sensor manager 340 may use updated time 336 and/or sensor data 344 corresponding to updated time 336 to perform one or more operations. For example, sensor manager 340 may use the sensor data from various sensors to generate an environment representation 342 of a physical environment associated with an autonomous or semi-autonomous machine. For example, sensor manager 340 may analyze and/or combine sensor data 344, which may correspond to one or more sensors (e.g., cameras, RADAR sensors, GPS sensors, etc.) of the autonomous machine, to generate environment representation 342 associated with that autonomous machine. In some embodiments, environment representation 342 may be provided to one or more control component(s) 312 (one of ECU(s) 104 of FIG. 1 or control component(s) 212 of FIG. 2), which may be used to navigate the physical environment.

Figure 4:
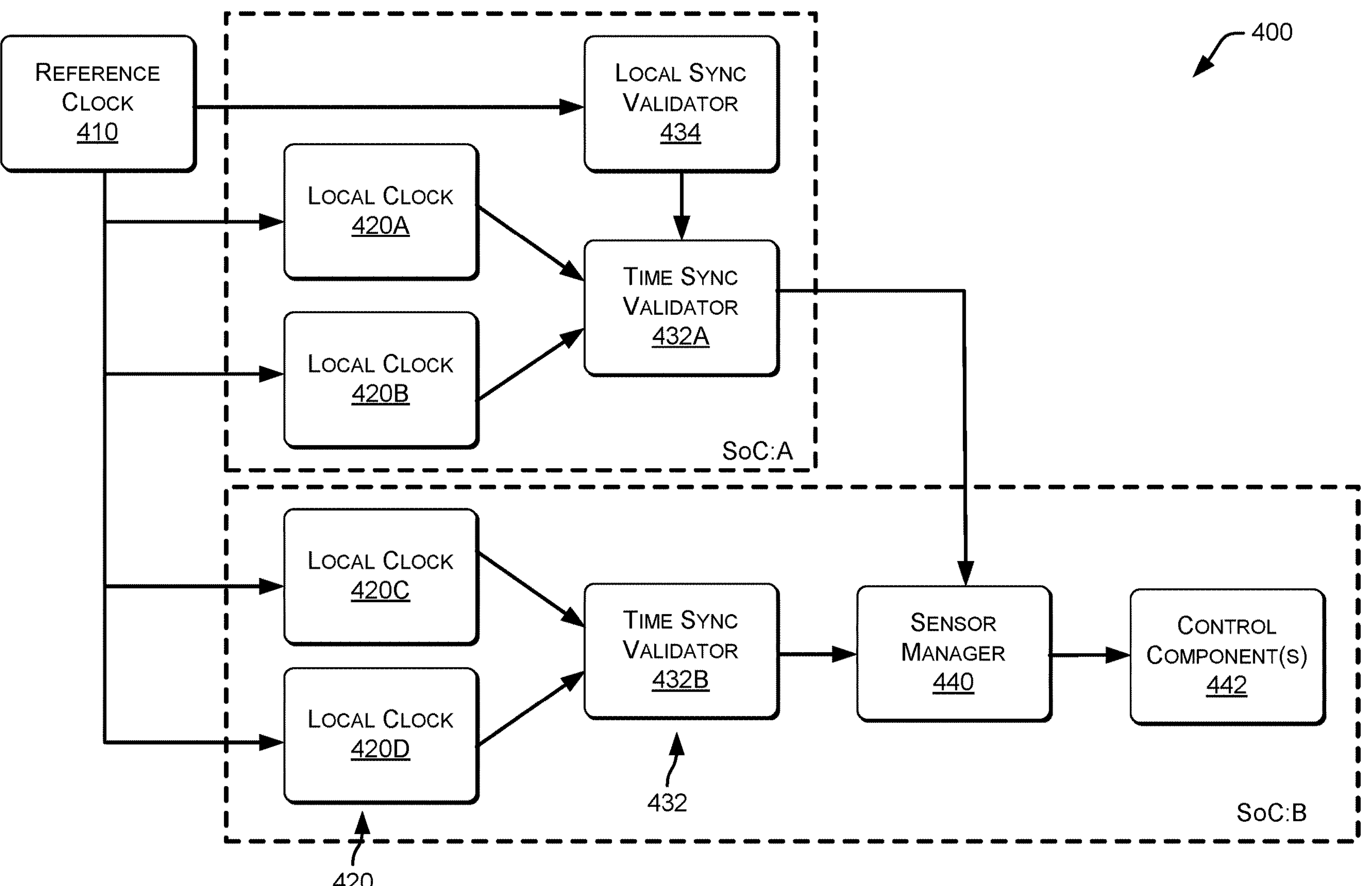
FIG. 4 is a diagram showing an example of a sensor synchronization, in accordance with some embodiments of the present disclosure.

Now referring to FIG. 4, FIG. 4 is a flow diagram showing an example time synchronization 400 of multiple SoCs, in accordance with some embodiments of the present disclosure. It should be understood that this and other arrangements described herein are set forth only as examples. At a high level, time synchronization 400 may involve a reference clock 410, one or more local clocks 420, and one or more time sync validators 432. In the embodiment illustrated, local clock(s) 420 and/or the time sync validator(s) 432 may be located in association with one or more SoCs, (e.g., SoC:A and SoC:B). In the embodiment illustrated, local clock(s) 420 include local clock 420A, local clock 420B, local clock 420C, and local clock 420D (referred to collectively herein as "local clock(s) 420") may be associated with a number of SoCs and/or other components. For example, SoC:A may include local clock 420A and local clock 420B, while local clock 420C and local clock 420D may be located in association with SoC:B. By way of a non-limiting example, reference clock 410 may be implemented using reference clock 110 (see FIG. 1), reference clock 206 (see FIG. 2), and/or reference clock 310 (see FIG. 3). By way of another non-limiting example, local clock(s) 420 may be implemented using local clock(s) 120 (see FIG. 1), local clock(s) 204 (see FIG. 2), and/or local clock 320 (see FIG. 3). By way of yet another non-limiting example, time sync validator(s) 432 may be implemented using sync validator 132 (see FIG. 1), sync validator 208 (see FIG. 2), and/or sync validator 332 (see FIG. 3). By way of yet another non-limiting example, SoC:A and/or SoC:B may be implemented using SoC(s) 102 (see FIG. 1).

In some embodiments, local clock(s) 420 may receive time information (e.g., reference time 316 illustrated in FIG. 3) from reference clock 410. Time information from reference clock 410 may be organized as a timestamp. In some embodiments, local clock(s) 420 may use time information received from reference clock 410 to generate updated time data. For example, local clock(s) 420 may append a locally generated timestamp to a timestamp generated by reference clock 410 in a data structure which may include timing information associated with local clock(s) 420 and reference clock 410, such as a time tuple (e.g., time tuple 326 illustrated in FIG. 3).

In some embodiments, local sync validator 434 may receive time information (e.g., reference time 316 illustrated in FIG. 3) from reference clock 410 and analyze the time information to identify potential time jumps and/or other timing inconsistencies associated with reference clock 410. In some embodiments, local sync validator 434 may determine that increments of time indicated by the received time information satisfy a time jump threshold. In some embodiments, if a time jump threshold is satisfied, local sync validator 434 may provide an indication to one or more of time sync validator(s) 432 that the time jump threshold has been satisfied and/or other suitable time information associated with reference clock 410. By way of yet another non-limiting example, local sync validator 434 may be implemented using one or more local validator(s) 134 (see FIG. 1).

Time synchronization 400 may include one or more time sync validators, such as time sync validator 432A and time sync validator 432B (referred to collectively or individually herein as "time sync validator(s) 432"). Time sync validator(s) 432 may be associated with one or more components, such as SoC:A and SoC:B. Time sync validator(s) 432 may be configured to receive time information, such as a time tuple, from one or more of local clock(s) 420 and/or local sync validator 434 and determine a time deviation represented in the time information. In some embodiments, one or more time sync validator(s) 432 may determine time deviations associated with a particular set of one or more local clock(s) 420, while another one or more of the time sync validator(s) 432 may determine a time deviation associated with a different set of one or more local clock(s) 420. In some embodiments, time sync validator(s) 432 may determine a corrective operation based on identifying a time deviation. For example, time sync validator(s) 432 may determine an amount of time (e.g., time offset) to adjust the time represented in one or more timestamps generated by local clock(s) 420. In some examples, time sync validator(s) 432 may perform a determined corrective operation. In some embodiments, time sync validator(s) 432 may provide sensor manager 440 with at least one updated timestamp and/or an indication that a corrective operation is needed. By way of a non-limiting example, sensor manager 440 may be implemented using sensor manager(s) 140 (see FIG. 1), sensor manager 210 (see FIG. 2), and/or sensor manager 340 (see FIG. 3).

In some embodiments, sensor manager 440 may receive sensor data and timestamps associated with one or more sensors (e.g., one or more sensor(s) 112 illustrated in FIG. 1, one or more sensor(s) 202 illustrated in FIG. 2, and/or the like). In some embodiments, sensor manager 440 may receive one or more updated timestamps from one or more time sync validator(s) 432, which may be located across one or more components and/or sub-systems, such as SoC:A and SoC:B, from the sensor manager 440. In some embodiments, sensor manager 440 may use the updated timestamps from time sync validator(s) 432 to combine one or more instances of associated sensor data to perform one or more operations, such as, without limitation, to generate an environmental representation that may be provided to one or more control component(s) 442 and may be used to navigate a physical environment corresponding to the environmental representation. By way of a non-limiting example, control component(s) 442 may be implemented using one or more ECU(s) 104 (see FIG. 1), one or more control component(s) 212 (see FIG. 2), and/or one or more control component(s) 312 (see FIG. 3).

Figure 5:
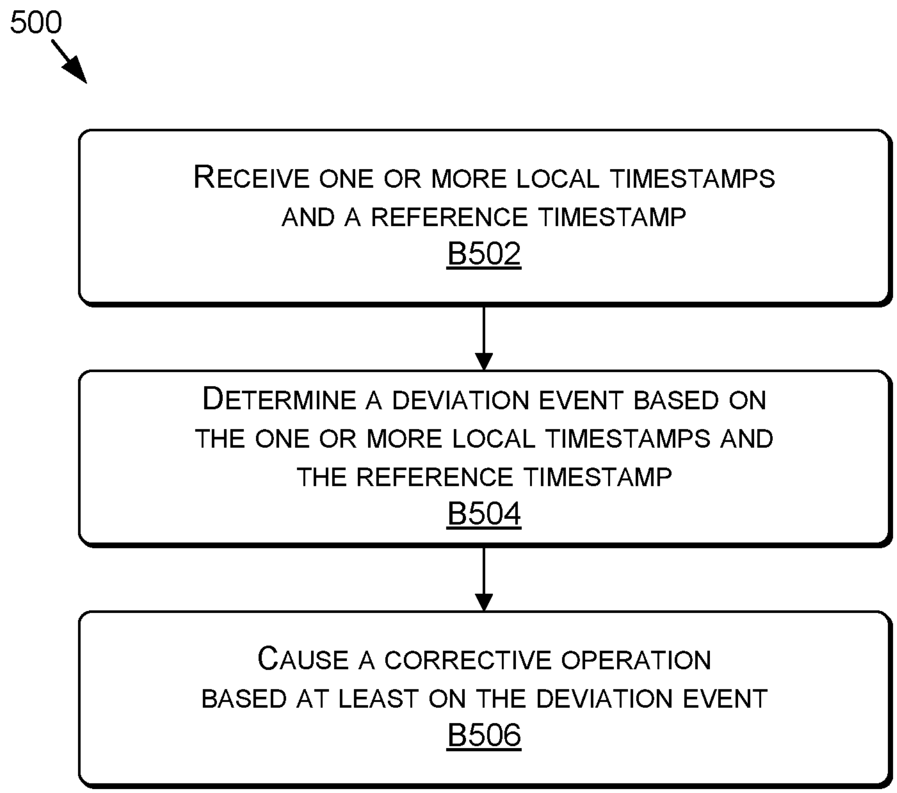
FIG. 5 is a flow diagram showing a method for performing a corrective synchronization operation, in accordance with some embodiments of the present disclosure.
Figure 6:
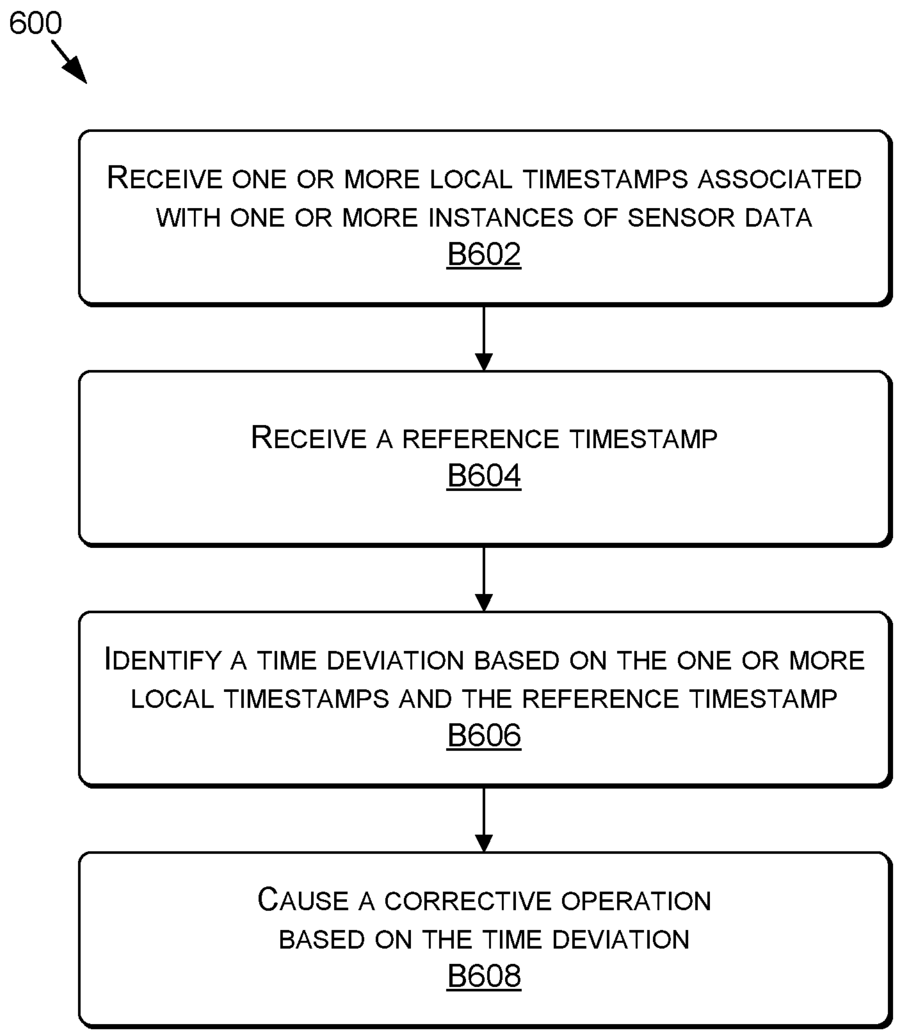
FIG. 6 is a flow diagram showing a method for determining a time deviation correction, in accordance with some embodiments of the present disclosure.

Now referring to FIGS. 5-7, each block of methods 500, 600, and 700, described herein, includes a computing process that may be performed using any combination of hardware, firmware, and/or software. For instance, various functions may be carried out by a processor executing instructions stored in memory. Methods 500, 600, and 700 may also be embodied as computer-usable instructions stored on computer storage media. Methods 500, 600, and 700 may be provided by a standalone application, a service or hosted service (standalone or in combination with another hosted service), or a plug-in to another product, to name a few. In addition, methods 500, 600, and 700 are described, by way of example, with respect to time synchronization system 100 of FIG. 1. However, these methods 500, 600, and 700 may additionally or alternatively be executed by any one system, or any combination of systems, including, but not limited to, those described herein.

FIG. 5 is a flow diagram showing method 500 for performing a corrective synchronization operation, in accordance with some embodiments of the present disclosure. Method 500, at block B502, includes receiving one or more local timestamps and a reference timestamp. For example, sync validators 132 may receive timestamps from one or more local clocks 120 and a timestamp from reference clock 110. In some embodiments, sync validators 132 may receive a local timestamp from local validator 134.

Method 500, at block B504, includes determining a deviation event based on the one or more local timestamps and the reference timestamp. For example, sync validators 132 may determine a deviation in the time represented by local timestamps from one or more local clocks 120 and that a deviation event has occurred. In some examples, sync validators 132 may determine a deviation event based on a calculated time deviation satisfying a predetermined deviation threshold.

Method 500, at block B506, includes causing a corrective operation based at least on the deviation event. For example, based on determining a deviation event, the sync validators 132 may perform a corrective operation that may include modifying one or more timestamps associated with sensor(s) 112 and/or may instruct sensor manager 140 to alter the manner in which it processes sensor data. After block B506, method 500 may terminate.

With reference to FIG. 6, FIG. 6 is a flow diagram showing method 600 for determining a time deviation correction, in accordance with some embodiments of the present disclosure. Method 600, at block B602, includes receiving one or more local timestamps associated with one or more instances or sensor data. For example, one or more sync validators 132 may receive timestamps associated with one or more of the sensor(s) 112 that may be generated by one or more local clocks 120.

Method 600, at block B604, includes receiving a reference timestamp. For example, reference clock 110 may provide a reference timestamp to one or more of the sync validators 132. In some examples, the reference timestamp from reference clock 110 may be received with the one or more local timestamps from one or more local clocks 120, organized as a time tuple.

Method 600, at block B606, includes identifying a time deviation based on the one or more local timestamps and the reference timestamp.

Method 600, at block B608, includes causing a corrective operation based at least on the time deviation. For example, once sync validators 132 have determined a time deviation using local and reference timestamps, a corrective operation may be performed by the sync validators 132 and/or sensor manager 140 to correct the identified time deviation. After block B608, method 600 may terminate.

Now referring to FIG. 7, FIG. 7 is a flow diagram showing method 700 for updating controls of an autonomous machine with corrected timestamps, in accordance with some embodiments of the present disclosure. Method 700, at block B702, includes detecting, based at least on a clock associated with at least one circuit, that the at least one circuit is operating asynchronously with respect to a reference clock. For example, sensor(s) 112 may generate streams of sensor data that includes timestamps according to clock sources of local clocks 120. One or more sync validators 132 may receive the sensor data and timestamps and detect a time deviation with a reference timestamp generated by reference clock 110 that may indicate that a sensor is operating asynchronously with reference clock 110.

Method 700, at block B704, includes responsive to the detecting, generating an indication that the at least one circuit is operating asynchronously. For example, sync validators 132, upon detecting a time deviation that may indicate that a sensor is operating asynchronously with reference clock 110, may generate an indication of the asynchronous operation.

Method 700, at block B706, includes causing a corrective operation to be performed based at least on the indication, wherein a component that receives data generated using the at least one circuit continues operating in view of the indication. For example, sensor manager 140 may receive an indication of a time deviation to generate updated timestamps that may be used by one or more control components of an autonomous machine to continue operating. After block B706, method 700 may terminate.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. The systems and methods described herein may be used in augmented reality, virtual reality, mixed reality, robotics, security and surveillance, autonomous or semi-autonomous machine applications, and/or any other technology spaces in which two or more clocks are synchronized.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, web-hosted services or web-hosted platforms, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for implementing web-hosted services (e.g., for program optimization at runtime) or web-hosted platforms (e.g., integrated development environments that include program optimization as a service), as an application programming interface ("API") between two or more separate applications or systems, and/or other types of systems.

Example Autonomous Vehicle

Figure 8A:
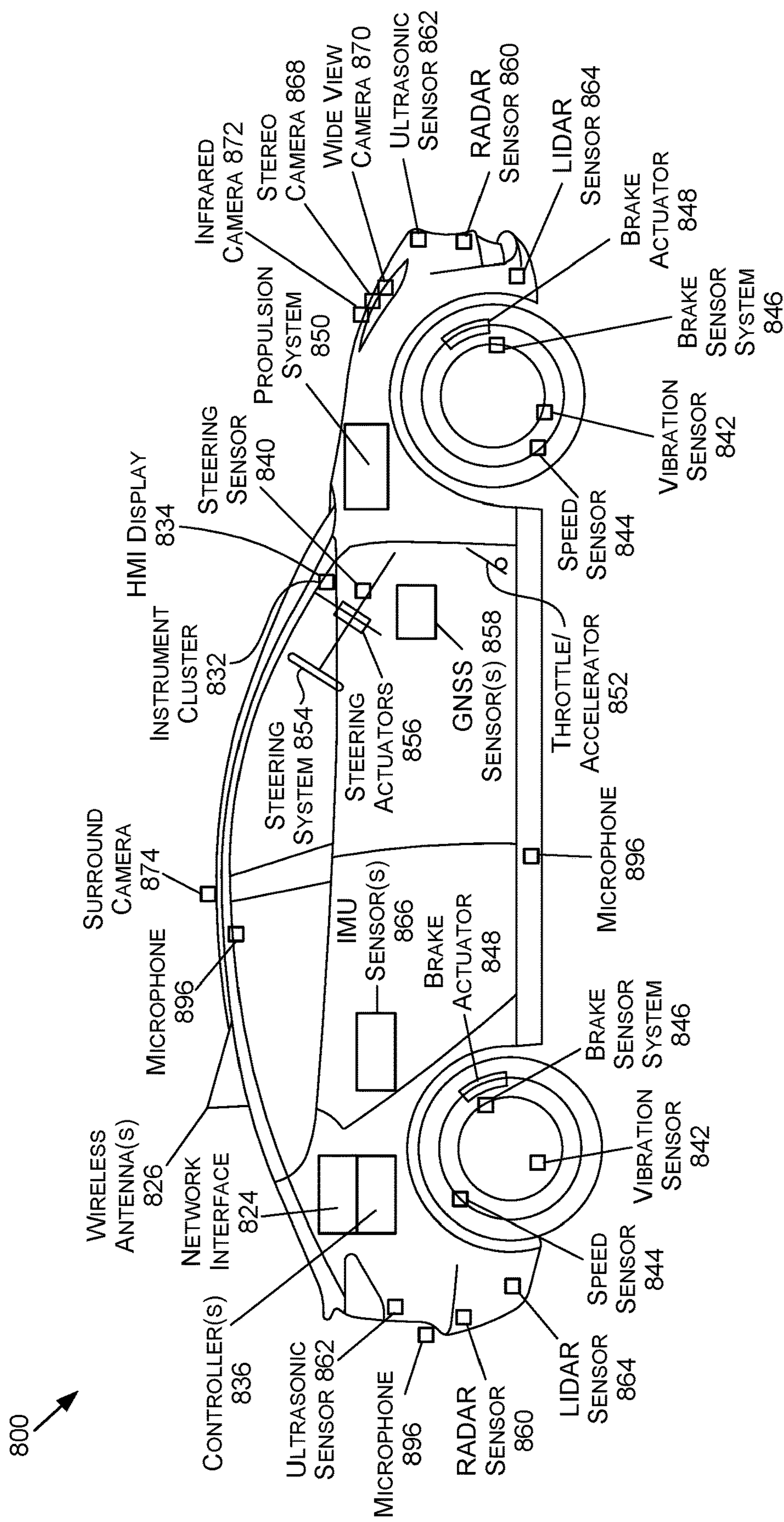
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more CPU(s), system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, and/or to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) 846 (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the location of the vehicle 800, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824, which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
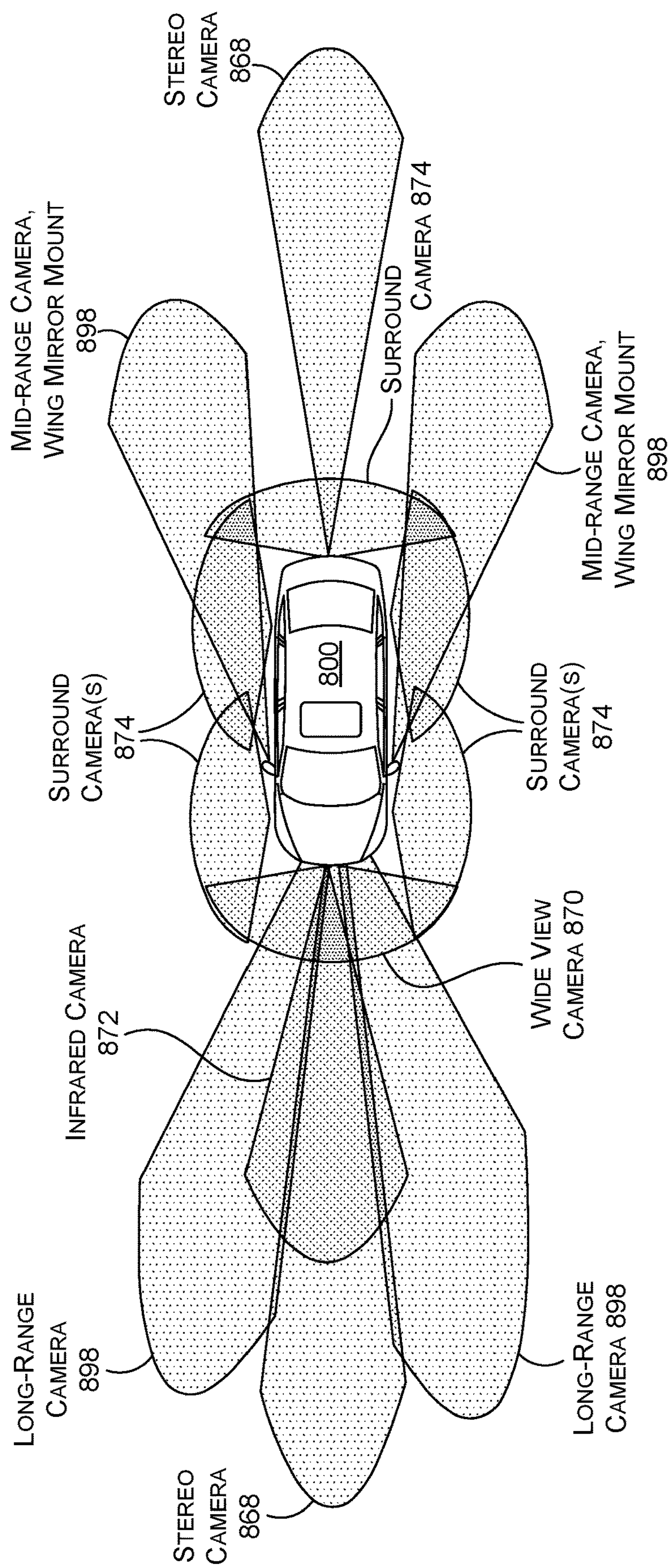
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 800 (e.g., front-facing cameras) may be used for surround view, to help identify forward-facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit including a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that includes portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned around the vehicle 800. The surround camera(s) 874 may include wide-view camera(s) 870, fisheye camera(s), 360-degree camera(s), and/or the like. For example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround-view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
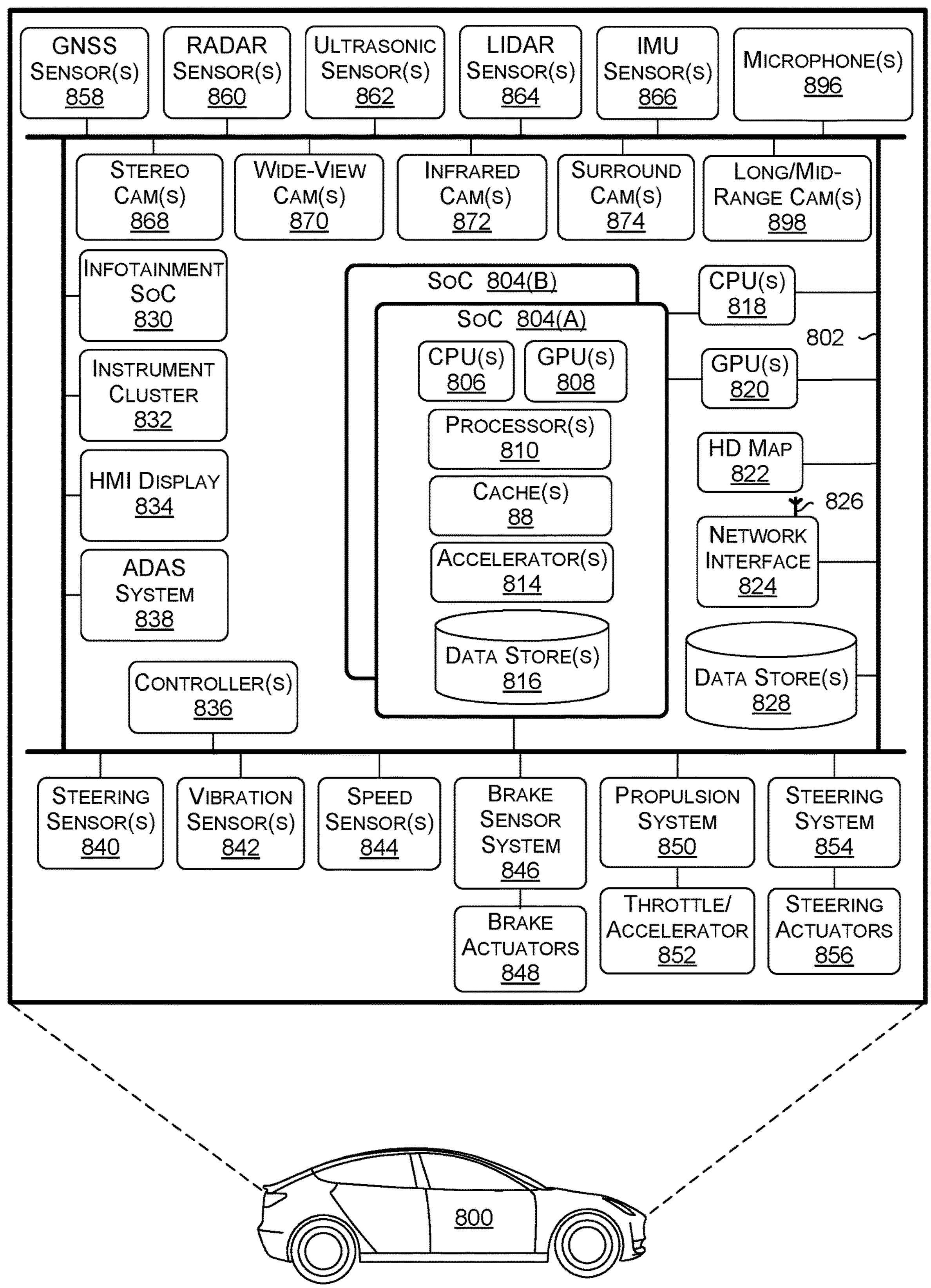
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C is illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of buses 802, which may include one or more CAN buses, one or more FlexRay buses, one or more Ethernet buses, and/or one or more other types of buses using a different protocol. In some examples, two or more buses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more buses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800 and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use computer-based application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting, and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected to both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 804 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 816 may include L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe-stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and actively performing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always-on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, which use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include an SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828, which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858 (e.g., GPS and/or assisted GPS sensors), to assist in mapping, perception, occupancy grid generation, and/or path planning functions. Any number of GNSS sensor(s) 858 may be used, including, for example and without limitation, a GPS using a USB connector with an Ethernet to serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data, in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 800 at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 100 m, with an accuracy of 2 cm-3 cm, and with support for a 100 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high-performance GPS-Aided Inertial Navigation System (GP SANS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include an SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjusts the vehicle speed to maintain a safe distance from vehicles ahead. Lateral ACC performs distance keeping, and advises the vehicle 800 to change lanes when necessary. Lateral ACC is related to other ADAS applications such as LC and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 800), while the I2V communication concept provides information about traffic farther ahead. CACC systems may include either or both I2V and V2V information sources. Given the information of the vehicles ahead of the vehicle 800, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may include and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network that is trained and thus reduces the risk of false positives, as described herein.

The vehicle 800 may further include the infotainment SoC 830 (e.g., an in-vehicle infotainment system (IVI)). Although illustrated and described as an SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 800. For example, the infotainment SoC 830 may include radios, disk players, navigation systems, video players, USB and Bluetooth connectivity, carputers, in-car entertainment, Wi-Fi, steering wheel audio controls, hands-free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe-stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
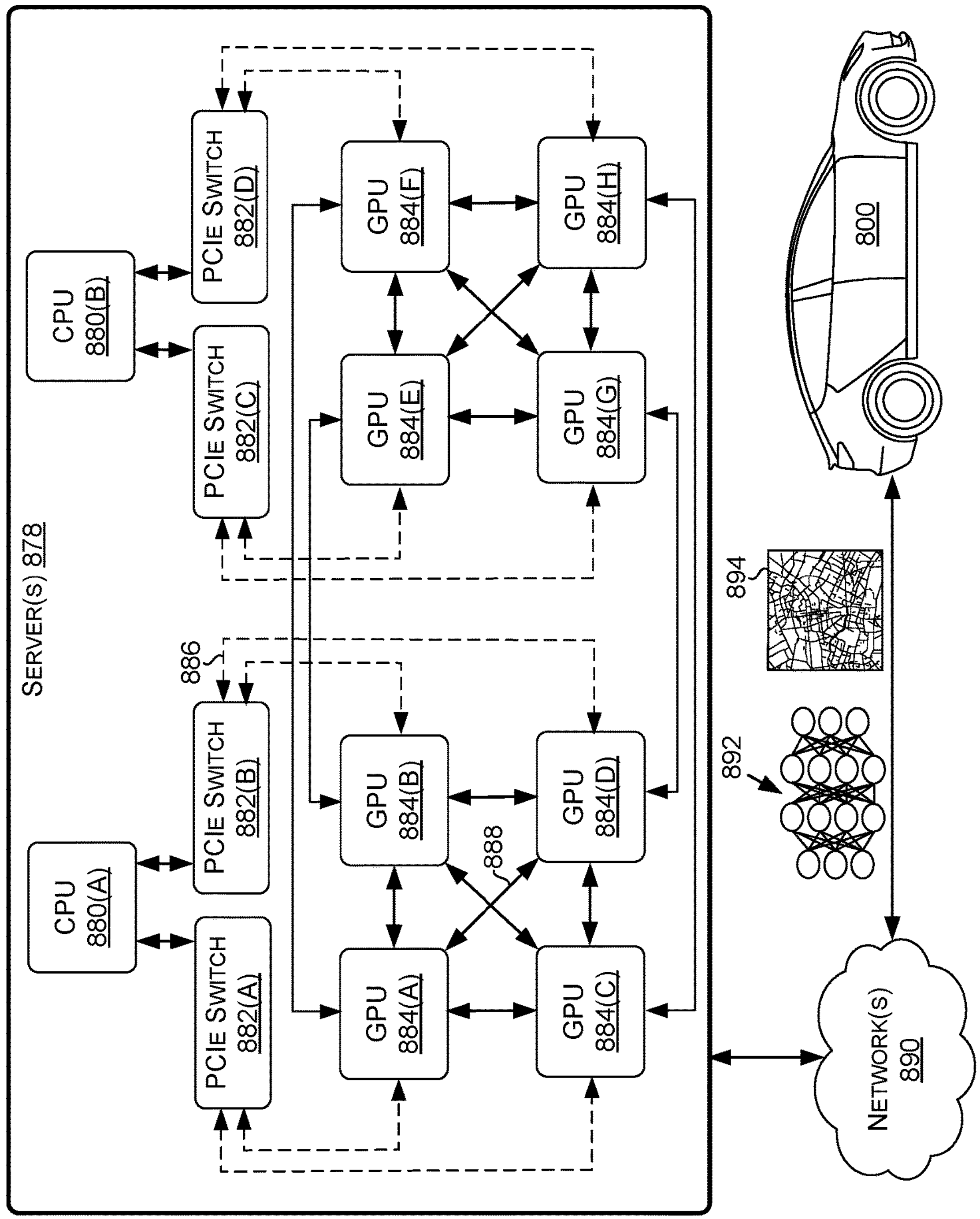
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced roadwork. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
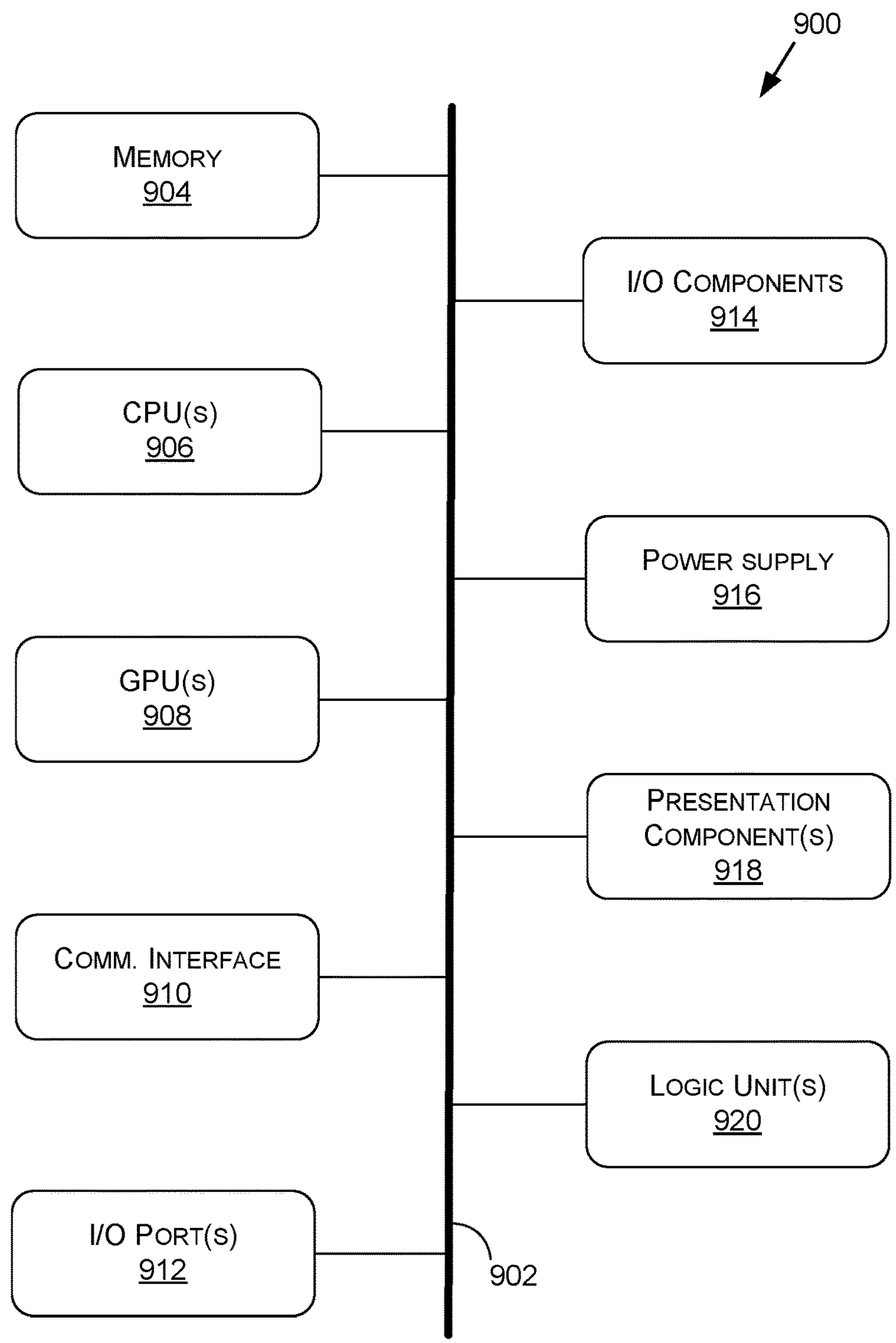
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, I/O ports 912, input/output components 914, a power supply 916, one or more presentation components 918 (e.g., display(s)), and one or more logic units 920.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 9.

The interconnect system 902 may represent one or more links or buses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point, connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may include computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 900. As used herein, computer storage media does not include signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, including wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built into (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

At least one embodiment of the disclosure can be described in view of the following clauses:

1. A method comprising: detecting, based at least on a clock associated with at least one circuit, that the at least one circuit is operating asynchronously with respect to a reference clock; responsive to the detecting, generating an indication that the at least one circuit is operating asynchronously; and causing a corrective operation to be performed based at least on the indication, wherein a component that receives data generated using the at least one circuit continues operating in view of the indication.

2. The method of clause 1, further comprising, responsive to the detecting, sending the indication to the component to cause the component to continue operating in view of the indication.

3. The method of clause 1 or 2, wherein the component continues to operate using data generated using one or more other circuits, while disregarding the data generated using the at least one circuit.

4. The method of any one of clauses 1-3, wherein, based at least on an updated timestamp corresponding to the data generated using the at least one circuit, the component continues to operate using the data, wherein the updated timestamp is generated based at least on a determined deviation between the clock and the reference clock.

5. The method of any one of clauses 1-4, wherein the at least one circuit corresponds to a first sensor, the component is a sensor fusion component, and the component performs sensor fusion using data generated using one or more second sensors and at least one of: disregards first data generated using the first sensor for at least one iteration; or performs the sensor fusion using second data generated using the first sensor, the second data determined based at least on an updated timestamp determined based at least on an amount of deviation between the clock and the reference clock.

6. The method of any one of clauses 1-5, wherein the detecting that the at least one circuit is operating asynchronously with respect to the reference clock comprises: receiving one or more local timestamps and a reference timestamp; and determining a deviation event based at least on the one or more local timestamps and the reference timestamp, wherein the generating the indication is based at least on the deviation event.

7. The method of any one of clauses 1-6, further comprising causing a modification to at least one local timestamp of the one or more local timestamps based at least on the deviation event.

8. The method of any one of clauses 1-7, wherein the determining the deviation event comprises calculating an offset value associated with the one or more local timestamps.

9. The method of any one of clauses 1-8, wherein the one or more local timestamps are associated with one or more local clock sources and one or more corresponding sensors, the at least one circuit corresponding to at least one sensor of the one or more corresponding sensors and the clock corresponding to the one or more local clock sources.

10. The method of any one of clauses 1-9, wherein the one or more local timestamps and the reference timestamp are received as one or more time tuples, and the deviation event is determined using the one or more time tuples.

11. The method of any one of clauses 1-10, wherein the determining the deviation event is further based at least on receiving an indication of a time interval associated with the reference timestamp.

12. The method of any one of clauses 1-11, further comprising: generating, using the component, an updated timestamp to cause one or more controls of an autonomous machine to be updated.

13. A system comprising: one or more processing devices to perform operations comprising: identifying, based at least on a comparison of one or more local timestamps to a reference timestamp, a time deviation corresponding to at least one sensor of one or more sensors; synchronizing the at least one sensor associated with at least one local timestamp of the one or more local timestamps using a reference clock by modifying the at least one local timestamp, the reference clock being used to generate the reference timestamp; and processing, using a component of the system and based at least on modifying the at least one local timestamp, data generated using the one or more sensors.

14. The system of clause 13, wherein the operations further comprise generating an indication of the time deviation.

15. The system of clause 13 or 14, wherein, for at least one iteration, the data generated using the one or more sensors does not include data generated using the at least one sensor.

16. The system of any one of clauses 13-15, wherein the operations further comprise modifying at least one local timestamp of the one or more local timestamps according to the time deviation.

17. The system of any one of clauses 13-16, wherein the identifying the time deviation includes comparing the reference timestamp to a first local timestamp of the one or more local timestamps and comparing the reference timestamp to a second local timestamp to determine a time offset between the first local timestamp and the second local timestamp.

18. The system of any one of clauses 13-17, wherein the one or more local timestamps are associated with one or more local clock sources of a machine.

19. The system of any one of clauses 13-18, wherein the operations further comprise causing the time deviation to be updated when a time interval associated with the reference timestamp satisfies a time interval threshold.

20. The system of any one of clauses 13-19, wherein the operations further comprise causing one or more controls of an autonomous machine to be modified when the time deviation satisfies a deviation threshold.

21. The system of any one of clauses 13-20, wherein the one or more processing devices are comprised in at least one of: a control system for an autonomous or semi-autonomous machine; a perception system for an autonomous or semi-autonomous machine; a first system for performing simulation operations; a second system for performing deep learning operations; a third system implemented using an edge device; a fourth system implemented using a robot; a fifth system incorporating one or more virtual machines (VMs); a sixth system implemented at least partially in a data center; a seventh system for performing digital twin operations; an eighth system for performing light transport simulation; a nineth system for performing collaborative content creation for 3D assets; a tenth system for performing conversational Artificial Intelligence operations; an eleventh system for generating synthetic data; a twelfth system for implementing a web-hosted service for detecting program workload inefficiencies; an application as an application programming interface ("API"); or a thirteenth system implemented at least partially using cloud computing resources.

22. A processor comprising: one or more processing units to perform one or more sensor fusion operations based at least on sensor data generated using a plurality of sensors, at least a portion of the sensor data being associated with an adjusted timestamp having been modified using a reference timestamp and one or more local timestamps associated with the sensor data.

23. The processor of clause 22, wherein the one or more local timestamps are associated with one or more local clock sources.

24. The processor of clause 22 or 23, wherein: the adjusted timestamp was modified based at in part on a time offset; and the time offset was determined by comparing the reference timestamp to a first local timestamp of the one or more local timestamps and comparing the reference timestamp to a second local timestamp of the one or more local timestamps to determine the time offset between the first local timestamp and the second local timestamp.

25. The processor of any one of clauses 22-24, wherein at least one output of the one or more sensor fusion operations is used to predict a position, at an instance of time, of a detected object in an environment of a machine.

26. The processor of any one of clauses 22-25, wherein the sensor data comprises a first sensor value corresponding to a first instance of time and a second sensor value corresponding to a second instance of time, and wherein the adjusted timestamp was modified using a time estimation for a third instance of time based at least on the first sensor value and the second sensor value.

27. The processor of any one of clauses 22-26, wherein the sensor data further comprises one or more safety integrity flags associated with the adjusted timestamp.

28. The processor of any one of clauses 22-27, wherein the processor is comprised in at least one of: a control system for an autonomous or semi-autonomous machine; a perception system for an autonomous or semi-autonomous machine; a first system for performing simulation operations; a second system for performing deep learning operations; a third system implemented using an edge device; a fourth system implemented using a robot; a fifth system incorporating one or more virtual machines (VMs); a sixth system implemented at least partially in a data center; a seventh system for performing digital twin operations; an eighth system for performing light transport simulation; a nineth system for performing collaborative content creation for 3D assets; a tenth system for performing conversational Artificial Intelligence operations; an eleventh system for generating synthetic data; a twelfth system for implementing a web-hosted service for detecting program workload inefficiencies; an application as an application programming interface ("API"); or a thirteenth system implemented at least partially using cloud computing resources.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

detecting, using a first component, based at least on a clock associated with at least one circuit, that the at least one circuit is operating asynchronously with respect to a reference clock;

responsive to the detecting, generating an indication that the at least one circuit is operating asynchronously; and causing a corrective operation to be performed based at least on the indication, wherein a second component, distinct from the at least one circuit, and that receives data generated using the at least one circuit continues operating in view of the indication.

2. The method of claim 1, further comprising, responsive to the detecting, sending the indication to the second component to cause the second component to continue operating in view of the indication.

3. The method of claim 1, wherein the second component continues to operate using data generated using one or more other circuits, while disregarding the data generated using the at least one circuit.

4. The method of claim 1, wherein, based at least on an updated timestamp corresponding to the data generated using the at least one circuit, the second component continues to operate using the data, wherein the updated timestamp is generated based at least on a determined deviation between the clock and the reference clock.

5. The method of claim 1, wherein the at least one circuit corresponds to a first sensor, the second component is a sensor fusion component, and the second component performs sensor fusion using data generated using one or more second sensors and at least one of:

disregards first data generated using the first sensor for at least one iteration; or performs the sensor fusion using second data generated using the first sensor, the second data determined based at least on an updated timestamp determined based at least on an amount of deviation between the clock and the reference clock.

6. The method of claim 1, wherein the detecting that the at least one circuit is operating asynchronously with respect to the reference clock comprises:

receiving one or more local timestamps and a reference timestamp; and determining a deviation event based at least on the one or more local timestamps and the reference timestamp, wherein the generating the indication is based at least on the deviation event.

7. The method of claim 6, further comprising causing a modification to at least one local timestamp of the one or more local timestamps based at least on the deviation event.

8. The method of claim 6, wherein the determining the deviation event comprises calculating an offset value associated with the one or more local timestamps.

9. The method of claim 6, wherein the one or more local timestamps are associated with one or more local clock sources and one or more corresponding sensors, the at least one circuit corresponding to at least one sensor of the one or more corresponding sensors and the clock corresponding to the one or more local clock sources.

10. The method of claim 6, wherein the one or more local timestamps and the reference timestamp are received as one or more time tuples, and the deviation event is determined using the one or more time tuples.

11. The method of claim 6, wherein the determining the deviation event is further based at least on receiving an indication of a time interval associated with the reference timestamp.

12. The method of claim 6, further comprising:

generating, using the second component, an updated timestamp to cause one or more controls of an autonomous machine to be updated.

13. A system comprising:

one or more processing devices to perform operations comprising:

identifying, using a first component based at least on a comparison of one or more local timestamps to a reference timestamp, a time deviation corresponding to at least one sensor of one or more sensors;

synchronizing the at least one sensor associated with at least one local timestamp of the one or more local timestamps using a reference clock by modifying the at least one local timestamp, the reference clock being used to generate the reference timestamp; and processing, using a second component of the system which is distinct from the at least one sensor, and based at least on modifying the at least one local timestamp, data generated using the one or more sensors.

14. The system of claim 13, wherein the operations further comprise generating an indication of the time deviation.

15. The system of claim 13, wherein, for at least one iteration, the data generated using the one or more sensors does not include data generated using the at least one sensor.

16. The system of claim 13, wherein the operations further comprise modifying at least one local timestamp of the one or more local timestamps according to the time deviation.

17. The system of claim 13, wherein the identifying the time deviation includes comparing the reference timestamp to a first local timestamp of the one or more local timestamps and comparing the reference timestamp to a second local timestamp to determine a time offset between the first local timestamp and the second local timestamp.

18. The system of claim 13, wherein the one or more local timestamps are associated with one or more local clock sources of a machine.

19. The system of claim 13, wherein the operations further comprise causing the time deviation to be updated when a time interval associated with the reference timestamp satisfies a time interval threshold.

20. The system of claim 13, wherein the operations further comprise causing one or more controls of an autonomous machine to be modified when the time deviation satisfies a deviation threshold.

21. The system of claim 13, wherein the one or more processing devices are comprised in at least one of:

a control system for an autonomous or semi-autonomous machine;

a perception system for an autonomous or semi-autonomous machine;

a first system for performing simulation operations;

a second system for performing deep learning operations;

a third system implemented using an edge device;

a fourth system implemented using a robot;

a fifth system incorporating one or more virtual machines (VMs);

a sixth system implemented at least partially in a data center;

a seventh system for performing digital twin operations;

an eighth system for performing light transport simulation;

a nineth system for performing collaborative content creation for 3D assets;

a tenth system for performing conversational Artificial Intelligence operations;

an eleventh system for generating synthetic data;

a twelfth system for implementing a web-hosted service for detecting program workload inefficiencies;

an application as an application programming interface ("API"); or a thirteenth system implemented at least partially using cloud computing resources.

22. A processor comprising:

one or more processing units to perform one or more sensor fusion operations based at least on sensor data generated using a plurality of sensors, at least a portion of the sensor data being associated with an adjusted timestamp having been modified using a reference timestamp and one or more local timestamps associated with the sensor data.

23. The processor of claim 22, wherein the one or more local timestamps are associated with one or more local clock sources.

24. The processor of claim 22, wherein:

the adjusted timestamp was modified based at in part on a time offset; and the time offset was determined by comparing the reference timestamp to a first local timestamp of the one or more local timestamps and comparing the reference timestamp to a second local timestamp of the one or more local timestamps to determine the time offset between the first local timestamp and the second local timestamp.

25. The processor of claim 22, wherein at least one output of the one or more sensor fusion operations is used to predict a position, at an instance of time, of a detected object in an environment of a machine.

26. The processor of claim 22, wherein the sensor data comprises a first sensor value corresponding to a first instance of time and a second sensor value corresponding to a second instance of time, and wherein the adjusted timestamp was modified using a time estimation for a third instance of time based at least on the first sensor value and the second sensor value.

27. The processor of claim 22, wherein the sensor data further comprises one or more safety integrity flags associated with the adjusted timestamp.

28. The processor of claim 22, wherein the processor is comprised in at least one of:

a control system for an autonomous or semi-autonomous machine;

a perception system for an autonomous or semi-autonomous machine;

a first system for performing simulation operations;

a second system for performing deep learning operations;

a third system implemented using an edge device;

a fourth system implemented using a robot;

a fifth system incorporating one or more virtual machines (VMs);

a sixth system implemented at least partially in a data center;

a seventh system for performing digital twin operations;

an eighth system for performing light transport simulation;

a nineth system for performing collaborative content creation for 3D assets;

a tenth system for performing conversational Artificial Intelligence operations;

an eleventh system for generating synthetic data;

a twelfth system for implementing a web-hosted service for detecting program workload inefficiencies;

an application as an application programming interface ("API"); or a thirteenth system implemented at least partially using cloud computing resources.

* * * * *